(12) United States Patent
Gilchrist

(10) Patent No.: US 6,950,949 B1
(45) Date of Patent: Sep. 27, 2005

(54) METHOD AND APPARATUS FOR PASSWORD ENTRY USING DYNAMIC INTERFACE LEGITIMACY INFORMATION

(75) Inventor: Jeffrey S. Gilchrist, Nepean (CA)

(73) Assignee: Entrust Limited, Ottawa (CA)

( * ) Notice: Subject to any disclaimer, the term of this patent is extended or adjusted under 35 U.S.C. 154(b) by 0 days.

(21) Appl. No.: 09/415,852

(22) Filed: Oct. 8, 1999

(51) Int. Cl.[7] .................. G06F 11/30; G06F 12/14; H04L 9/00; H04L 9/32
(52) U.S. Cl. ...................... 713/202; 713/200
(58) Field of Search ......................... 713/202

(56) References Cited

U.S. PATENT DOCUMENTS

| | | | | |
|---|---|---|---|---|
| 5,706,427 A | * | 1/1998 | Tabuki | 713/201 |
| 5,903,721 A | * | 5/1999 | Sixtus | 713/201 |
| 5,946,665 A | * | 8/1999 | Suzuki et al. | 705/26 |
| 6,209,104 B1 | * | 3/2001 | Jalili | 713/202 |

* cited by examiner

*Primary Examiner*—Gregory Morse
*Assistant Examiner*—Christopher J Brown
(74) *Attorney, Agent, or Firm*—Vedder, Price, Kaufman & Kammholz, P.C.

(57) ABSTRACT

A password entry method and apparatus prompts a user for entry of a password and outputs dynamic password entry interface legitimacy information in response to the prompt for entry of the password. The dynamic password entry interface legitimacy information may be a hard to duplicate animated image, audio sequence, or other suitable legitimacy information that allows a user to visually or audibly determine whether the password entry interface being presented is legitimate. Accordingly, the user will know whether or not to trust the password entry interface, such as a password dialog box displayed on a display device, prior to entering password information.

37 Claims, 4 Drawing Sheets

METHOD AND APPARATUS FOR PASSWORD ENTRY USING DYNAMIC INTERFACE LEGITIMACY INFORMATION

FIELD OF THE INVENTION

The invention relates generally to apparatus and methods for providing secure entry of passwords, and more particularly to methods and apparatus that provide password entry interface security enhancement.

BACKGROUND OF THE INVENTION

Passwords are used to gain access to software applications, bank vaults and a litany of other sources or processes. In computer systems, telecommunication systems and other systems, password entry interfaces are used that typically prompt a user to enter a password to gain access to protected information, products, or any other protected sources. Where password entry interfaces are implemented through software programs, such as graphic user interfaces, DOS based password prompts or similar password entry interfaces, there is typically no way for a user to know they are about to type a password into a real program or a malicious program designed to mimic the real program. For example, where a password entry interface is employed using a graphic user interface to allow a user to gain access to a cryptographic security engine on a network, information over the Internet from a Web page, or any other suitable source, a Trojan horse program, or other malicious program, can attempt to mimic the password entry interface thereby allowing an unscrupulous party to obtain a given password. The password may then be used to break into protected sources. In the context of a computer system, when the password is stolen, a hacker can gain access to the computer system and highly confidential information.

Typical password entry interfaces may include, for example, a Windows-based graphic user interface dialog box known to be used by many software applications and operating systems. These dialog boxes typically include a field for a user's name and other field for the user to enter a password or other information via a keyboard or other biometric input device, such as a thumb print, retinal scan information, or other suitable biometric input to be used as a password. However, such password entry interfaces are typically static in nature and relatively easy to mimic by a malicious program. In addition, the interfaces are typically the same for all users for a given software application, or operating system. As a result, a malicious program may be inadvertently downloaded through e-mails, or other communications without a user's knowledge.

Also, it is generally known to provide three dimensional rotating symbols during, for example, an encrypted Internet session, to show that an encrypted session is in progress. Such three dimensional rotating symbols may appear, for example, in a Web browser when a secure session has been set up between a Web browser and a Web server. However, such known systems typically provide a static password entry interface that can be readily mimicked by a malicious program.

Consequently, there exists a need for a method and apparatus that facilitates prevention of a mimicking of a password entry interface so that a user can detect that a malicious program is attempting to steal and enter the password.

BRIEF DESCRIPTION OF THE DRAWINGS

The invention will be more readily understood in view of the below-described drawings, wherein.

DETAILED DESCRIPTION OF THE PREFERRED EMBODIMENT

Briefly, a password entry method and apparatus prompts a user for entry of a password and outputs dynamic password entry interface legitimacy information in response to the prompt for entry of the password. The dynamic password entry interface legitimacy information may be a hard to duplicate or hard to predict animated image (e.g., image that changes over time), audio sequence, or other suitable legitimacy information that allows a user to visually or audibly determine whether the password entry interface being presented is legitimate. Accordingly, the user knows whether or not to trust, or have a high confidence level of the legitimacy of the password entry interface, such as a password dialog box displayed on a display device, for example.

In one embodiment, the dynamic password entry interface legitimacy information is a three dimensional moving image that is presented either prior to prompting for entry of the password, subsequently after prompting for entry of the password, or is output during the prompting for the entry of the password. In another embodiment, the dynamic password entry interface legitimacy information is audible information that may be recognized by user as being an original audible output associated with a trusted password entry interface presented on a display screen.

In another embodiment, a method and apparatus provides a plurality of animated images, such as images that change over time, from which a user may select or which can be automatically selected. The selected image is then shown to the user along with the prompt for entry of the password for subsequent entries of the password. The user, having selected one of a plurality of animated images, recognizes whether or not the presented image in the password entry interface is the one selected and therefore knows whether or not to continue entering password information as requested by the password entry interface. Since the dynamic password entry interface legitimacy information is a hard to produce moving image or audible set of frequencies, it is more difficult for a malicious program to mimic the password dialog box containing, or otherwise associated with, the dynamic password entry interface legitimacy information. Accordingly, with selectable animated images, an attacker must not only mimic the hard to duplicate animated image, but an attacker also has to know which of the potential animated images was selected by the user.

Figure 1:
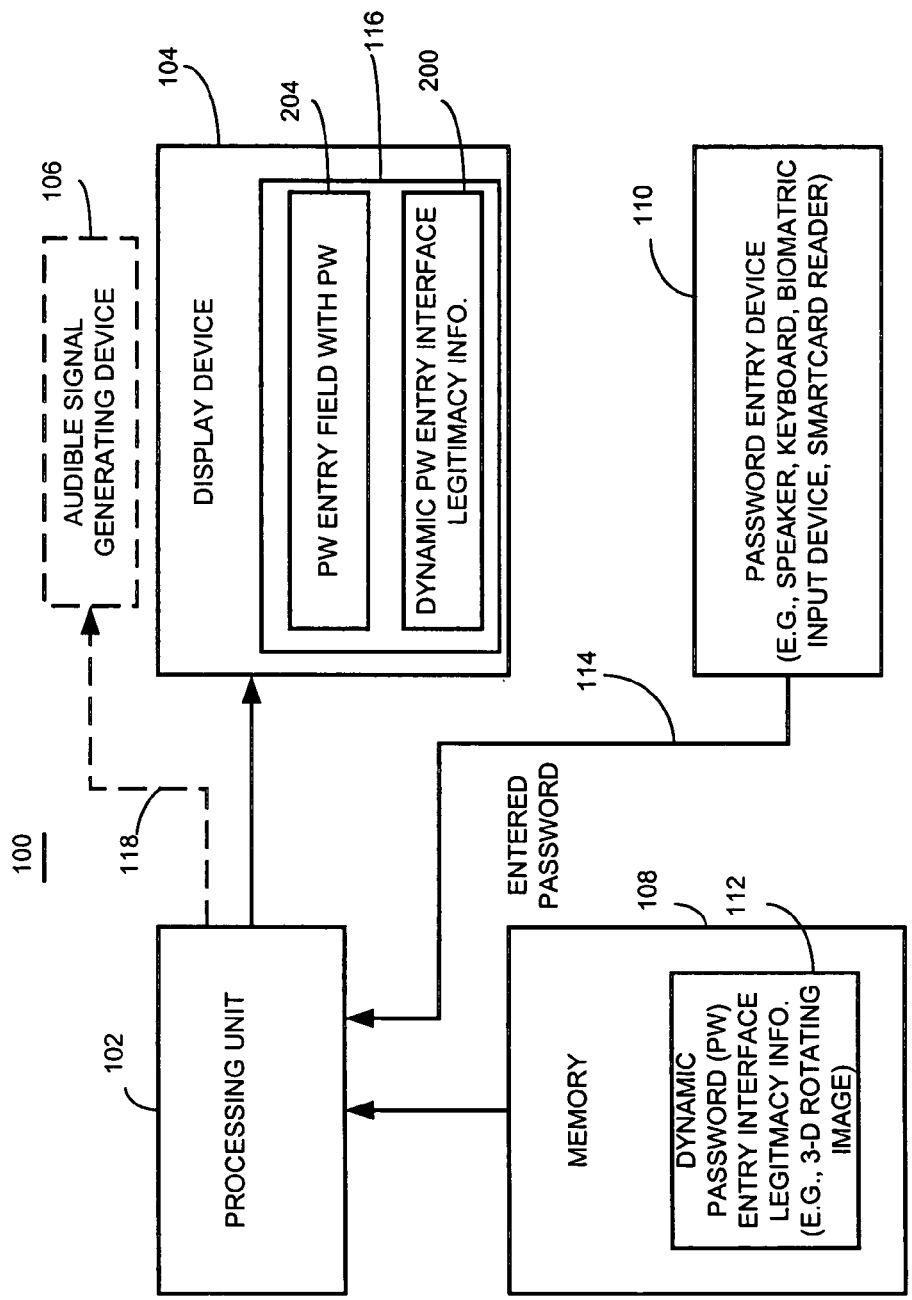
FIG. 1 is a block diagram illustrating one example of a password entry apparatus in accordance with one embodiment of the invention.

FIG. 1 illustrates a password entry apparatus 100 having a processing unit 102, a display device 104 and/or audible generating device 106, memory 108 and a password entry device 110. By way of example, and not limitation, the processing unit 102 may be, for example, a personal computer, portable telecommunications device, television, wireless communication device such as an information appliance, or any other suitable processing unit that may be used to prompt a user or software application or other source, for entry of a password to gain access to a protected product, application, or other process. The display device 104 may be, for example, any suitable display device such as an LCD display, flat panel display, CRT, television display, or any other suitable display device. The audible generating device 106 may be, for example, any suitable hardware or software, including speakers that may output audible signals. The memory 108 may be any suitable memory operatively coupled to the processing unit for storing, inter alia, dynamic password entry interface legitimacy information 112, such as password entry animated images as further described below. The password entry device 110 may be, for example, a keyboard, voice activated input mechanism, biometric input mechanism, a smart card reader or any other suitable password entry mechanism. The password entry device 110 is operatively coupled to the processing unit 102 so that the processing unit 102 receives the entered password 114. For purposes of illustration only, the disclosed apparatus and methods will be described with reference to a computer, such as a personal computer. However, it will be recognized that any suitable networked, non-networked, wireless, non-wireless, stand alone, portable, or any other suitable apparatus, or system may also employ the herein described invention.

The processing unit 102 is operative to provide a password entry interface, generally shown as 116, via the display device 104 and/or an audible generating device 106. The processing device 102 provides the password entry interface 116 to provide a prompt for entry of a password. The memory 108, such as RAM, ROM, or other suitable storage device contains dynamic password entry interface legitimacy information 112 for output to the display device and/or audible generating device 104, 106 to provide password entry interface security enhancement. The memory 108, for example, where it is memory accessible by a personal computer, contains one or more suitable programs to generate the graphic user interface (GUI). Accordingly, in a preferred embodiment, the password entry interface is a GUI based password entry interface, such as that shown, for example, in FIG. 2. However, it will be recognized that a non GUI may also be used.

Figure 2:
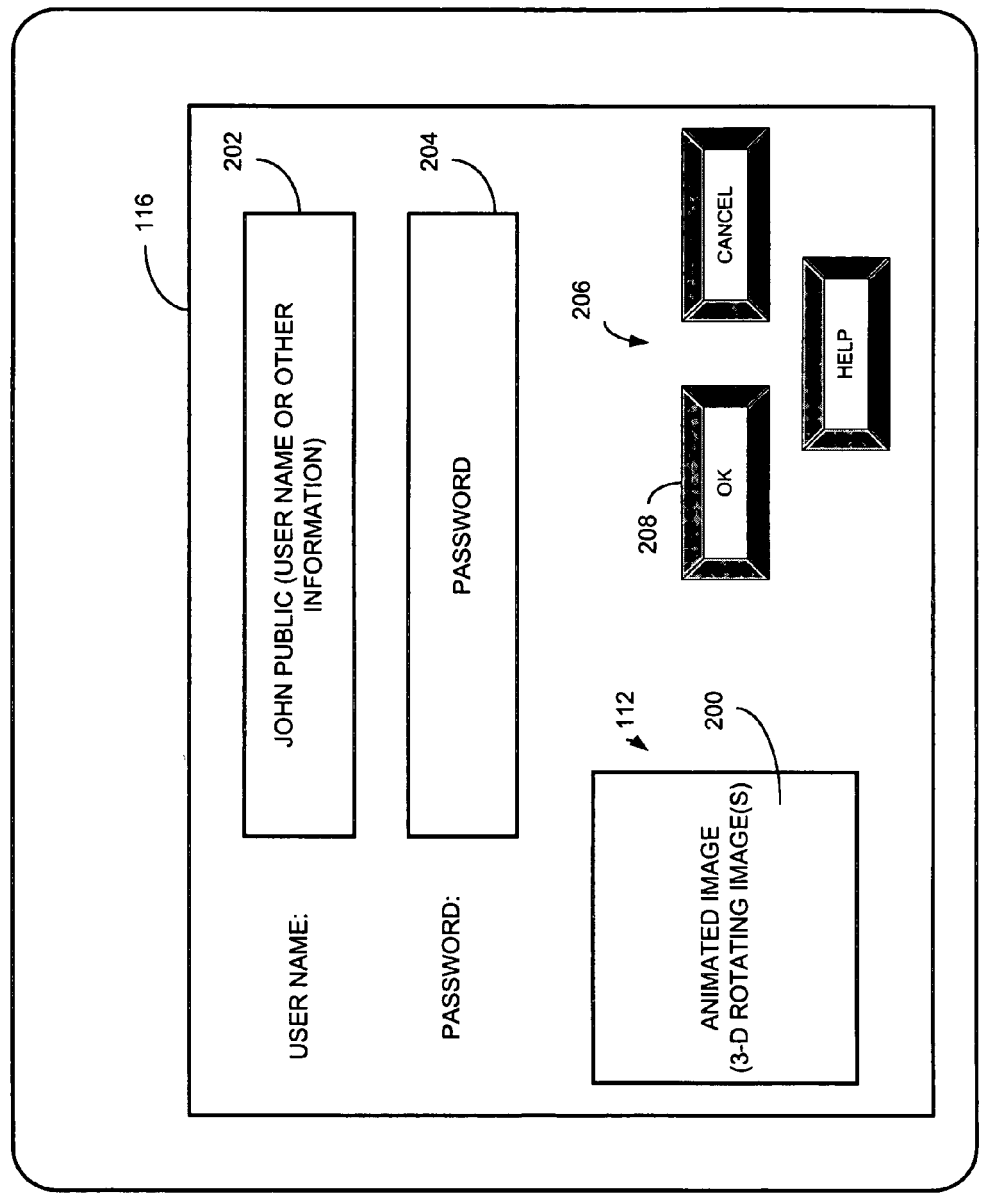
FIG. 2 is a graphical representation of a password entry interface in accordance with one embodiment of the invention.

Referring to FIG. 2, the password entry interface 116 as shown on display device 104, may include dynamic password entry interface legitimacy information 112, such as a three dimensional rotating animated image 200 that is difficult to reproduce. In addition, if desired, the password entry interface 116 may include a graphic box associated with a user ID field 202 for the user, for example, to enter the user's name, or any other suitable identification information. The password entry interface 116 also includes a password prompt field 204, into which a user enters the password that has been prompted for. In addition, other activation buttons generally shown as 206 may also be provided through the graphic user interface. For example, once a password has been entered (e.g., the appropriate text has been entered, and/or biometric information through the use of a biometric input device), the "OK" button 208 may be activated to signal the processing unit to accept the entered password.

Referring back to FIG. 1, the dynamic password entry interface legitimacy information 112 stored in memory may include, for example, three dimensional rotating images that are displayed before, during or after the prompt for entry of the password. The processing device 102 outputs the dynamic password entry interface legitimacy information 112 to the display device and/or audible generating device 106, 104 in response to the prompt for entry of the password. In this example, the prompt for entry of the password is the password box 204 (FIG. 2). However, it will be recognized that other graphic user interfaces, a simple flashing cursor or other suitable mechanism may serve as a prompt for entry of a password. Although not shown in FIG. 2, additional text may be included in the password entry interface 116. For example, instructions for the user to visually confirm that the displayed dynamic password entry interface legitimacy information 112 has not changed from that previously displayed may be provided.

Where the dynamic password entry interface legitimacy information is an animated image whether, meaning for example, an image having what appear to be moving components, a still image that changes over time, or any suitable information that changes over time, the processing device displays the animated image 200 in connection with the prompting for entry of the password. Accordingly, the animated image 200 may be displayed at the same time the prompt for the password is given, prior to the prompting for the password, or subsequent to the prompting of the password. As used herein, the animated image includes data or programming code that and when stored, can later be made to appear to have portions vary over time when displayed or audibly output.

In any event, the animated image 200 is presented so that the user can visually confirm that their animated image is appropriate so that the user may enter the password believing that the password entry interface is a legitimate password entry interface as opposed to one generated by a malicious program. If the animated image 200 is different from that what the user expects, the user then does not enter the password in the password entry interface 116 since it is likely to have been generated by a malicious program.

In addition to, or as an alternative to providing animated image information, the processing unit may also store audible information, such as tones, a user's voice, songs, or any other suitable audible information that can serve as the dynamic password entry interface legitimacy information 112. Where this information 112 includes audible information, the processing device provides the audible information 118 to the audible generating device so that in the same way that the animated image is used, the audible output serves as a mechanism to allow the user to audibly confirm that the password entry interface is legitimate since the audible tone or information being generated should be identical to that provided by the user.

Referring to FIGS. 1 and 2, where the dynamic password entry interface legitimacy information 112 is an animated image (or a plurality of animated images) the processing unit 102 retrieves from the memory 108, the animated image and displays the animated image as part of the password entry interface 116 on the display device 104. However, it will be recognized that the animated image may be displayed separately from the password entry interface so that it appears apart from or at a different time than the password dialog box, for example.

In an alternative embodiment, the dynamic password entry interface legitimacy information 112 may be an expected graphical pattern that changes in response to entry of one or more entered password characters. This may be used alone or in addition to the animated image 200. For example, an animated image that is changes over time may have changes to its pattern via different colors or other suitable differentiating visual changes that are made by the processing unit in response to entry of one or more entered password characters entered through the password entry device 110. In this embodiment, an additional level of security is provided since not only must an attacker recreate the animated image, such as a 3D rotational image, but must also appropriately mimic graphical patterns that change in response to entry of password characters. By way of example, if the animated image 200 is a rotating sphere with a random number pattern appearing on the outer surface thereof, sections of this sphere may be changed in color each time a correct password character has been received by the processing unit. The graphical pattern may be selected from a group of pattern changing algorithms stored in memory 108 and selected by a user upon initial log in of the system so that the user will recognize and remember which pattern changing algorithm was selected.

In addition, another alternative embodiment may include, for example, the processing device 102 altering one or more features of the animated image in response to entry of one or more entered password characters. For example, using the same example above, the rotating sphere may be elongated to a greater extent each time a password character is entered through the password entry device. It will also be recognized that other suitable visual changes to the animated images, or other portions of the password entry interface may also be employed.

In yet another embodiment, the animated image is a still image that changes dynamically before, after, or while the password is being typed in. For example, a static image of words are displayed and the words are covered up with a certain pattern or revealed if hidden in a certain pattern as one or more password characters are entered.

Although it is preferred that the processing device display the animated image 200 during the allowance of password input, the processing device may be suitably programmed to display the animated image prior to allowing input of a password or may be programmed to display the animated image after allowing input of a password but, for example, prior to accepting the password. As shown in FIG. 2, the processing device displays the password entry interface 116 as having a password entry field 204. Although the password entry field 204 is shown, it will be recognized that the processing device can alternately, or in addition, receive biometric information such as eye scan information, thumbprint information, or other biometric information through a suitable biometric input device serving as the password entry device, in response to displaying the password entry interface 116.

In an alternative embodiment, instead of containing a single animated image for a given user or for a given software application, the memory 108 may contain a plurality of selectable animated images as the dynamic password entry interface legitimacy information. In this embodiment, the processing unit is suitably programmed to receive selection data, such as an activation of a selection button through a graphic user interface, that identifies which of the plurality of selectable animated images have been selected by a user for output on the display device during prompting for password entry. By way of example, the processing unit, upon initial log in, displays the plurality of animated images on the display device so that a user may select which of the plurality of animated images will be used as the dynamic password entry interface legitimacy information 112. Accordingly, a user may customize the password entry interface to contain a particular animated image. In yet another embodiment, the animated image may be, for example, a moving picture of the user, or any other suitable video that the user wishes to store in memory and use as the dynamic password entry interface legitimacy information.

Figure 3:
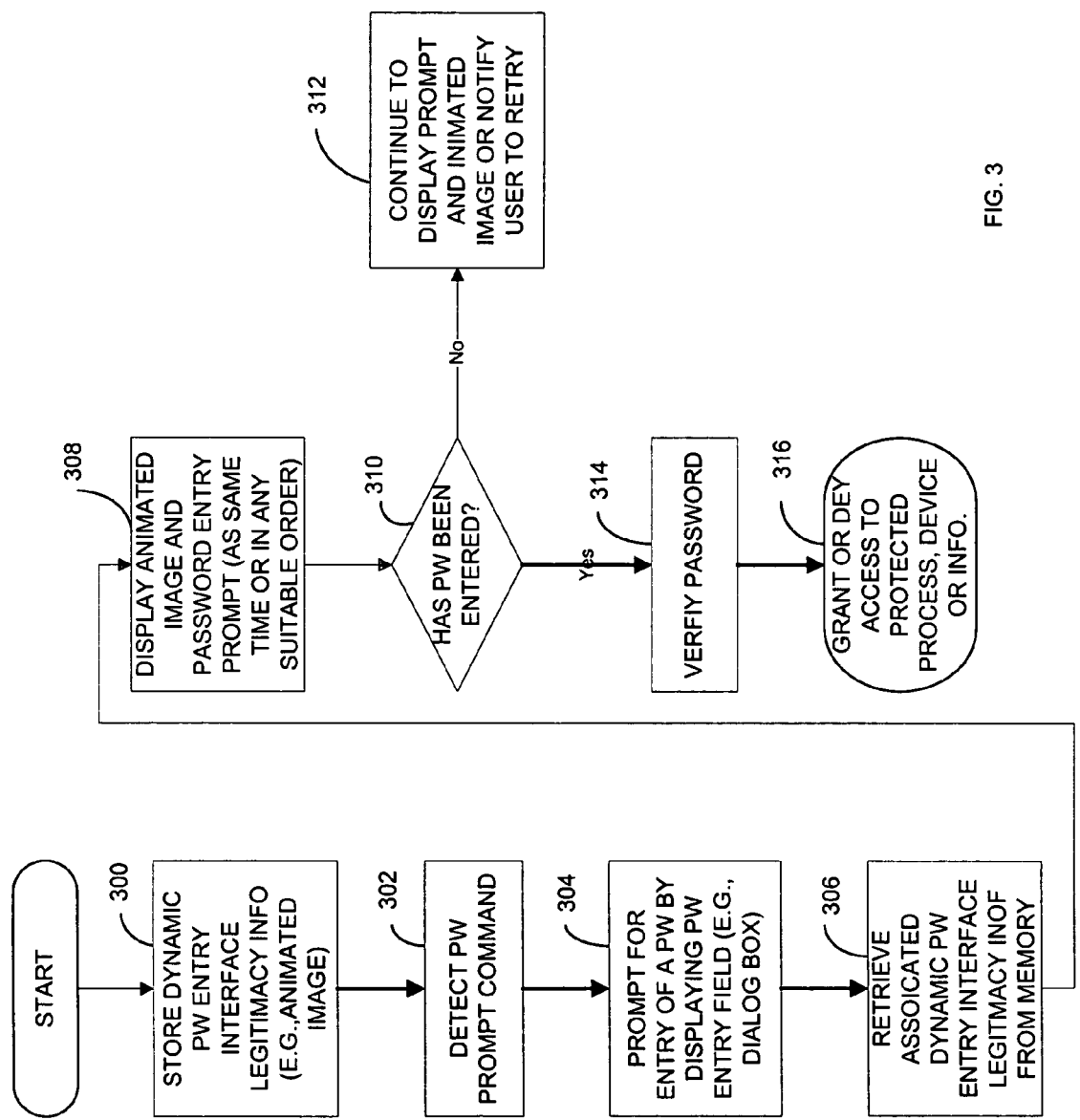
FIG. 3 is a flow chart illustrating one example of the operation of the apparatus of FIG. 1.

FIG. 3 illustrates one example of a password entry method utilized by the apparatus shown in FIG. 1. In this example, the processing unit 102 stores an animated image for retrieval for use as part of a password entry interface The animated image can be embedded in the password program itself. For example, the animated image is coded such that the code draws the animated image and this code is embedded and part of the password program. The animated image serves as the dynamic password entry interface legitimacy information 112. This is shown in block 300. The storage of the animated image, such as a three dimensional rotating image, typically occurs once during initialization. As shown in block 302, the processing unit 102 detects a password prompt command from, in this example, a software application that requires entry of a password to gain access to protected information, such as access to a public key information security engine. As shown in block 304, the processing unit 102 prompts for entry of a password by including the password field 204 as part of the password entry interface 116. The password entry interface 116 is displayed on display device 104. As shown in block 306, the processing unit 102 retrieves the associated animated image from memory that is associated with the particular password entry interface being displayed. As shown in block 308, the processing unit 102 displays the stored animated image, retrieved from memory, during the prompting for entry of a password, to provide password entry interface security enhancement. In a preferred embodiment, the animated image is displayed at the same time as the prompt for the password. Accordingly, the processing unit 102 outputs the dynamic password entry interface legitimacy information 112, (e.g., the animated image) in connection with the prompting for entry of the password.

As shown in block 310, the method includes determining whether a password has been entered As shown in block 310, the processing unit determines if it has received selection data, such as entry of a return key or activation of a GUI "OK" button 200 indicating that the password has been entered. If the password has not been detected as being entered, the processing device continues to display the prompt for entry of the password and continues to display the animated image as shown in block 312. Alternatively, if a password has not been entered in a predetermined period of time, the processing unit can notify the user to retry entry of the password. If it has been detected that the password has been entered, the processing unit verifies the entered password, as shown in block 314. This is done in a conventional manner. For example, if biometric information serving as a password or a portion of the password the processing unit determines if the entered password information 114 matches the expected password. Likewise, if the password entry device includes entry of password characters via keyboard or smart card reader or from some other source, again, the processing unit compares the entered password with the expected password to determine if the password has been entered. As shown in block 316, if the entered password matches the expected password, the processing unit 102 grants access to the protected information, such as a cryptographic key associated with an information security engine, a protected device or other protected process, in response to receiving the valid password information after a prompt for the password.

Figure 4:
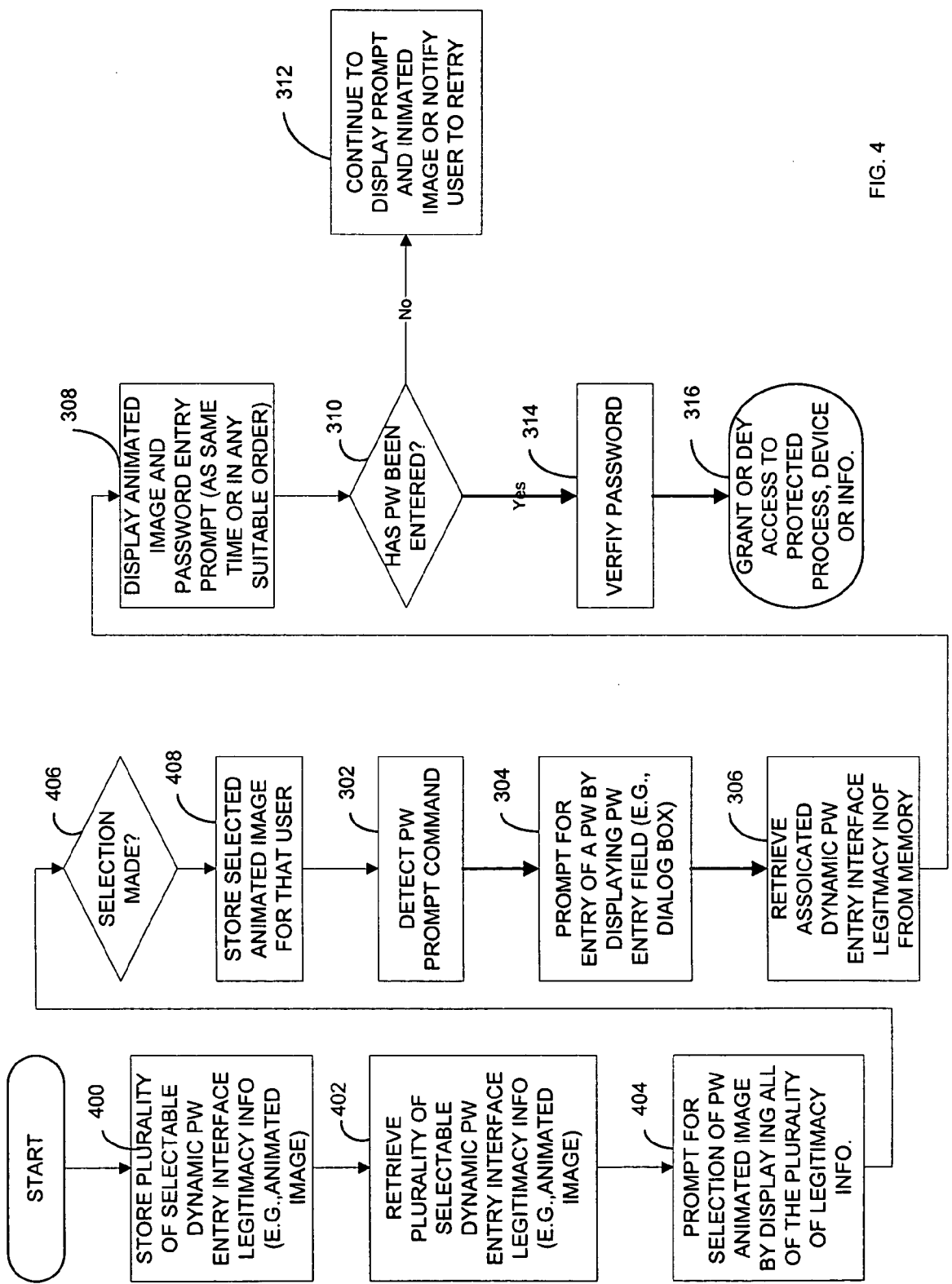
FIG. 4 is a flow chart illustrating an alternative password entry method in accordance with one embodiment of the invention.

FIG. 4 illustrates an alternative method that employs selectable animated images as the dynamic password entry interface legitimacy information 112. As shown in block 400, the method includes storing the plurality of animated images as the dynamic password entry interface legitimacy information 112 in memory 108. As shown in block 402, the processing unit 102 retrieves the dynamic password entry interface legitimacy information, e.g., multiple password entry animated images, from memory. As shown in block 404, the processing unit, through a suitable graphical user interface command, prompts a user for selection of one of the plurality of selectable animated images to serve as the animated image to be displayed as part of the password entry interface (e.g., dialog box). As shown in block 406, the processing unit determines whether selection has been made by, for example, determining whether a select button has been activated for a given displayed animated image. If no selection is made, the processing unit waits until a selection is made by a user. If it is determined that a selection has been made, the process includes storing the selected animated image for that user for that particular application, in memory, as shown in block 408. This occurs, for example, during initialization. The process continues to block 302, as previously described with reference to FIG. 3.

Accordingly, the disclosed apparatus and methods provide dynamic password entry interface legitimacy information, that is difficult to mimic, during prompts for entry of passwords. As a result, a user can detect whether a malicious program has attempted to mimic a password entry interface so that the user is less susceptible to theft of password information. Differing degrees of protection can be provided depending upon the complexity of the animation.

If desired, the disclosed apparatus and methods may be implemented using one or more suitably programmed processing devices such as a personal computer, microprocessor, hand held processing units or any other suitable processing devices. A storage medium, such as a CD ROM, DRAM, fixed or portable storage device, a remote storage device, such as a network server, or any other suitable storage medium may contain programming instructions that when executed by one or more processors, causes the one or more processors to carry out the operations and function described herein.

As used herein, dynamic password entry interface legitimacy information includes, but is not limited to, data that changes over time including moving images, still images that vary over time, whether video or graphic, same frequency audio output, different frequency audio output, or any suitable combination thereof that is output in connection with prompting for a password to gain access to a task, software application or any other process.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A password entry method comprising the steps of:
   prompting for entry of a password;
   outputting dynamic password entry interface legitimacy information in connection with the prompting for entry of the password including displaying an animated image in connection with the prompting for entry of the password; and
   altering at least one feature of the animated image in response to entry of one or more entered password characters prior to accepting the password.

2. The method of claim 1 wherein the step of outputting dynamic password entry interface legitimacy information includes providing an audible output in connection with the prompting for entry of the password.

3. The method of claim 1 including the step of storing the animated image for retrieval for use as part of a password entry interface.

4. The method of claim 1 including the step of displaying the animated image prior to allowing input of a password.

5. The method of claim 1 including the step of displaying animated image after allowing input of a password.

6. The method of claim 1 wherein the step of prompting for entry of a password includes displaying a password entry field; and wherein the step of displaying the animated image includes displaying an animated image associated with the password entry field.

7. The method of claim 1 including the step of receiving biometric information in response to the step of prompting for the password.

8. The method of claim 1 including the step of receiving text information in response to the step of prompting for the password.

9. The method of claim 1 including the step of storing a plurality of selectable animated images as the dynamic password entry interface legitimacy information and selecting, in response to user input, at least one of the plurality of selectable animated images for output on a display device during prompting for password entry.

10. The method of claim 1 wherein the animated image is unique to a password.

11. The method of claim 1 wherein the animated image includes a moving three-dimensional image.

12. The method of claim 11 including the step of granting access to an information security engine in response to receiving valid password information after prompting for the password.

13. A password entry method comprising the steps of:
   storing an animated image for retrieval for use as part of a password entry interface;
   prompting for entry of a password as part of the password entry interface;
   displaying the stored animated image during the prompting for entry of the password to provide password entry interface security enhancement; and
   altering at least one visual feature of the animated image in response to entry of at least one entered password characters prior to accepting the password.

14. The method of claim 13 wherein the step of prompting for entry of a password includes displaying a password entry field; and wherein the step of displaying the animated image includes displaying an animated image associated with the password entry field.

15. The method of claim 13 including the step of receiving biometric information in response to the step of prompting for entry of the password.

16. The method of claim 13 including the step of receiving text information in response to the step of prompting for entry of the password.

17. The method of claim 16 including the steps of:
   storing a plurality of selectable animated images, and
   selecting, in response to user input, at least one of the plurality of selectable animated images for output on a display device during prompting for password entry.

18. The method of claim 13 wherein the animated image is unique to a password.

19. The method of claim 13 wherein the animated image includes a moving three-dimensional image.

20. The method of claim 16 including the step of granting access to an information security engine in response to receiving valid password information after prompting for the password.

21. A password entry apparatus comprising:
a processing device operative to provide a password entry interface to provide a prompt for entry of a password;
memory, operatively coupled to the processing device, containing dynamic password entry interface legitimacy information for output, to provide password entry interface security enhancement;
the processing device being operatively coupled to a display device and displays an animated image in connection with the prompting for entry of the password and alters at least one feature of the animated image in response to entry of at least one entered password characters and prior to accepting the password.

22. The apparatus of claim 21 wherein the processing device outputs the dynamic password entry interface legitimacy information in response to the prompt for entry of the password.

23. The apparatus of claim 21 wherein the processing device provides an audible output, as the dynamic password entry interface legitimacy information, in connection with the prompting for entry of the password.

24. The apparatus of claim 21 wherein the processing device retrieves from the memory, the animated image and displays the animated image as part of the password entry interface on the display device.

25. The apparatus of claim 21 wherein the processing device outputs an expected graphical pattern that changes in response to entry of one or more entered password characters.

26. The apparatus of claim 21 wherein the processing device displays the animated image prior to allowing input of a password.

27. The apparatus of claim 21 wherein the processing device displays the animated image after allowing input of a password.

28. The apparatus of claim 21 wherein the processing device display the password entry interface having a password entry field.

29. The apparatus of claim 21 wherein the processing device receiving biometric information in response to displaying the password entry interface.

30. The apparatus of claim 21 wherein the memory contains a plurality of selectable animated images as the dynamic password entry interface legitimacy information and wherein the processing device receives a selection data identifying at least one of the plurality of selectable animated images for output on a display device during prompting for password entry.

31. The apparatus of claim 21 wherein the animated image includes a moving three-dimensional image.

32. The apparatus of claim 21 wherein the processing device grants access to an information security engine in response to receiving valid password information after prompting for the password.

33. A storage medium comprising:
memory containing programming instructions that when executed by one or more processors, causes the one or more processors to:
prompt for entry of a password;
output dynamic password entry interface legitimacy information in connection with the prompting for entry of the password including displaying an animated image in connection with the prompting for entry of the password; and
altering at least one feature of the animated image in response to entry of one or more entered password characters prior to accepting the password.

34. The storage medium of claim 33 including memory containing programming instructions that when executed by the one or more processors, causes the one or more processors to provide an audible output in connection with the prompting for entry of the password.

35. The storage medium of claim 33 including memory containing programming instructions that when executed by the one or more processors, causes the one or more processors to output an expected graphical pattern that changes in response to entry of one or more entered password characters.

36. The storage medium of claim 33 including memory containing programming instructions that when executed by the one or more processors, causes the one or more processors to display a password entry field; and to display an animated image associated with the password entry field.

37. The storage medium of claim 33 including memory containing programming instructions that when executed by the one or more processors, causes the one or more processors to receive biometric information in response to prompting for the password.

* * * * *